United States Patent
Yi et al.

(10) Patent No.: US 10,943,174 B2
(45) Date of Patent: Mar. 9, 2021

(54) ANOMALY IDENTIFICATION METHOD FOR STRUCTURAL MONITORING DATA CONSIDERING SPATIAL-TEMPORAL CORRELATION

(71) Applicant: Dalian University of Technology, Dalian (CN)

(72) Inventors: Tinghua Yi, Dalian (CN); Haibin Huang, Dalian (CN); Hongnan Li, Dalian (CN); Shuwei Ma, Dalian (CN)

(73) Assignee: Dalian University of Technology, Liaoning (CN)

( * ) Notice: Subject to any disclaimer, the term of this patent is extended or adjusted under 35 U.S.C. 154(b) by 392 days.

(21) Appl. No.: 16/090,744

(22) PCT Filed: Feb. 12, 2018

(86) PCT No.: PCT/CN2018/076574
§ 371 (c)(1),
(2) Date: Oct. 2, 2018

(87) PCT Pub. No.: WO2018/145662
PCT Pub. Date: Aug. 16, 2018

(65) Prior Publication Data
US 2019/0122131 A1    Apr. 25, 2019

(30) Foreign Application Priority Data
Feb. 13, 2017 (CN) .......................... 201710070354.7

(51) Int. Cl.
| | | |
|---|---|---|
| G06N 7/00 | (2006.01) | |
| G06F 17/11 | (2006.01) | |
| G06F 17/16 | (2006.01) | |
| G06F 17/15 | (2006.01) | |
| G06K 9/00 | (2006.01) | |
| G06F 11/07 | (2006.01) | |
| G06F 30/23 | (2020.01) | |
| G06F 111/10 | (2020.01) | |

(52) U.S. Cl.
CPC .............. *G06N 7/00* (2013.01); *G06F 11/07* (2013.01); *G06F 17/11* (2013.01); *G06F 17/15* (2013.01); *G06F 17/16* (2013.01); *G06F 30/23* (2020.01); *G06K 9/00* (2013.01); *G06F 2111/10* (2020.01)

(58) Field of Classification Search
None
See application file for complete search history.

(56) References Cited

U.S. PATENT DOCUMENTS

| 7,016,825 B1 * | 3/2006 | Tryon, III ............... G06F 30/23 |
| | | 703/6 |
| 2010/0076756 A1 | 3/2010 | Douglas et al. |
| 2016/0140269 A1 * | 5/2016 | Wang ..................... G06F 30/23 |
| | | 703/1 |

FOREIGN PATENT DOCUMENTS

| CN | 102928514 A | 2/2013 |
| CN | 104655425 A | 5/2015 |
| CN | 106897505 A | 6/2017 |

OTHER PUBLICATIONS

Jie et al., "Blind Source Separation Method Based on Eigen Value and Singular Value," Journal of Tianjin University, Vo. 38, No. 8, Aug. 2005, 4 pages.

* cited by examiner

*Primary Examiner* — Craig C Dorais
(74) *Attorney, Agent, or Firm* — Muncy, Geissler, Olds & Lowe, P.C.

(57) ABSTRACT

The present invention belongs to the technical field of health monitoring for civil structures, and an anomaly identification method considering spatial-temporal correlation is proposed for structural monitoring data. First, define current and past observation vectors for the monitoring data and pre-whiten them; second, establish a statistical correlation model for the pre-whitened current and past observation vectors to simultaneously consider the spatial-temporal correlation in the monitoring data; then, divide the model into two parts, i.e., the system-related and system-unrelated parts, and define two corresponding statistics; finally, determine the corresponding control limits of the statistics, and it can be decided that there is anomaly in the monitoring data when each of the statistics exceeds its corresponding control limit.

1 Claim, No Drawings

ANOMALY IDENTIFICATION METHOD FOR STRUCTURAL MONITORING DATA CONSIDERING SPATIAL-TEMPORAL CORRELATION

TECHNICAL FIELD

The present invention belongs to the technical field of health monitoring for civil structures, and an anomaly identification method considering spatial-temporal correlation is proposed for structural monitoring data.

BACKGROUND

The service performance of civil structures will inevitably deteriorate due to the collective effects of long-term loadings, environmental corrosion and fatigue factors. Through in-depth analysis of structural monitoring data, the abnormal condition of structures can be discovered in time and an accurate safety early-warning can then be provided, which has important practical significance for ensuring the safe operation of civil structures. At present, the anomaly identification of structural monitoring data is mainly achieved through statistical methods, which can be generally divided into two categories: 1) the univariate control chart, such as the Shewhart control chart, the CUSUM control chart and so forth, which is used to establish separate control chart for the monitoring data at each measurement point to identify anomalies in the monitoring data; and 2) the multivariate statistical analysis, such as the principal component analysis, the independent component analysis and so forth, which employs the correlation between monitoring data at multiple measurement points to establish a statistical model, and then defines corresponding statistics to identify anomalies in the monitoring data.

Due to the deformation continuity of structures, there exists correlation (i.e., cross-correlation or spatial correlation) between structural response data at the adjacent measurement points. In practical engineering applications, multivariate statistical analysis is more advantageous since the cross-correlation can be considered. In addition, this kind of method only needs to define 1 or 2 statistics to decide whether there is anomaly in the monitoring data, which is very convenient for the structural health monitoring system including many sensors. In addition to cross-correlation, there is autocorrelation (i.e., temporal correlation) in structural response data. If the autocorrelation and cross-correlation (i.e., the spatial-temporal correlation) can be considered simultaneously in the statistical modeling process, the anomaly identification ability of the multivariate statistical analysis method can be improved, making it more practical in engineering applications.

SUMMARY

The present invention aims to propose a statistical modeling method which considers the spatial-temporal correlation simultaneously, based on that statistics are defined to identify anomalies in the structural monitoring data. The technical solution of the present invention is as follows: first, define current and past observation vectors for the monitoring data and pre-whiten them; second, establish a statistical correlation model for the pre-whitened current and past observation vectors to simultaneously consider the spatial-temporal correlation in the monitoring data; then, divide the model into two parts, i.e., the system-related and system-unrelated parts, and define two corresponding statistics; finally, determine the corresponding control limits of the statistics, and it can be decided that there is anomaly in the monitoring data when each of the statistics exceeds its corresponding control limit.

An anomaly identification method for structural monitoring data considering spatial-temporal correlation, the specific steps of which are as follows:

Step 1: Monitoring data preprocessing (1) Define current and past observation vectors for the normal monitoring data:

$$y^c(t)=y(t)$$

$$y^p(t)=[y^T(t-1), y^T(t-2), \ldots, y^T(t-l)]^T$$

where $y(t) \in \Re^m$ represents the sample at time t in the normal monitoring data, and m represents the number of measured variables; $y^c(t)$ and $y^p(t)$ represent the current and past observation vectors defined at time t, respectively; l represents the time-lag;

(2) Pre-whiten the current observation vector $y^c(t)$ and past observation vector $y^p(t)$:

$$\tilde{y}^c(t)=R^c y^c(t)$$

$$\tilde{y}^p(t)=R^p y^p(t)$$

where $R^c$ and $R^p$ represent the pre-whitening matrices corresponding to $y^c(t)$ and $y^p(t)$, respectively; $\tilde{y}^c(t)$ and $\tilde{y}^p(t)$ represent the pre-whitened current and past observation vectors, respectively;

Step 2: Spatial-temporal correlation modeling (3) Establish the spatial-temporal correlation model for the normal monitoring data, that is, establish the statistical correlation model between $\tilde{y}^c(t)$ and $\tilde{y}^p(t)$ as follows:

$$(\tilde{C}_{pp}^{-1}\tilde{C}_{pc}\tilde{C}_{cc}^{-1}\tilde{C}_{cp})\varphi=\lambda^2\varphi$$

$$(\tilde{C}_{cc}^{-1}\tilde{C}_{cp}\tilde{C}_{pp}^{-1}\tilde{C}_{pc})\psi=\lambda^2\psi$$

where $\tilde{C}_{pp}=E\{\tilde{y}^p\tilde{y}^{pT}\}$ and $\tilde{C}_{cc}=E\{\tilde{y}^c\tilde{y}^{cT}\}$ represent the auto-covariance matrices of $\tilde{y}^p(t)$ and $\tilde{y}^c(t)$, respectively; $\tilde{C}_{pc}=E\{\tilde{y}^p\tilde{y}^{cT}\}$ and $\tilde{C}_{cp}=E\{\tilde{y}^c\tilde{y}^{pT}\}$ represent the cross-covariance matrices of $\tilde{y}^p(t)$ and $\tilde{y}^c(t)$, respectively;

(4) Since $\tilde{y}^p(t)$ and $\tilde{y}^c(t)$ are pre-whitened data, $\tilde{C}_{pp}$ and $\tilde{C}_{cc}$ are both identity matrices; by additionally considering $\tilde{C}_{pc}^T=\tilde{C}_{cp}$ and $\tilde{C}_{cp}^T=\tilde{C}_{pc}$, the statistical correlation model between $\tilde{y}^p(t)$ and $\tilde{y}^c(t)$ can be further simplified as follows:

$$(\tilde{C}_{pc}\tilde{C}_{pc}^T)\varphi=\lambda^2\varphi$$

$$(\tilde{C}_{cp}\tilde{C}_{cp}^T)\psi=\lambda^2\psi$$

(5) The solution of the above statistical correlation model can be obtained by the following singular value decomposition:

$$\tilde{C}_{pc}=E\{\tilde{y}^p\tilde{y}^{cT}\}=\Phi\Lambda\Psi^T$$

where $\Phi=[\varphi_1, \varphi_2, \ldots, \varphi_{ml}] \in \Re^{ml \times ml}$ and $\Psi=[\psi_1, \psi_2, \ldots, \psi_{ml}] \in \Re^{m \times m}$ represent matrices consisting all left and right singular vectors, respectively; $\Lambda \in \Re^{ml \times m}$ represents the singular value matrix, in which the m non-zero singular values are correlation coefficients between $\tilde{y}^p(t)$ and $\tilde{y}^c(t)$;

(6) Define the projection of $\tilde{y}^p(t)$ on $\Phi$, termed as z(t), which can be obtained by:

$$z(t)=\Phi^T\tilde{y}^p(t)=\Phi^T R^p y^p(t)=Q y^p(t)$$

where $Q=\Phi^T R^p$;

Step 3: Define statistics (7) Since there are only m non-zero correlation coefficients, the variables in z(t) can be divided into two parts:

$$z_s(t)=Q_s y^p(t)$$

$$z_n(t)=Q_n y^p(t)$$

where $z_s(t)$ and $z_n(t)$ represent the system-related and system-unrelated parts of z(t), respectively; $Q_s$ and $Q_n$ represent the first m rows and last m(l−1) rows of Q, respectively;

(8) To identify anomalies in the monitoring data, two statistics can be defined for $z_s(t)$ and $z_n(t)$:

$$H_s^2 = z_s^T z_s = y^{pT}(Q_s^T Q_s) y^p$$

$$H_n^2 = z_n^T z_n = y^{pT}(Q_n^T Q_n) y^p$$

For the newly acquired monitoring data, the past observation vector $y^p$ is constructed firstly; the two corresponding statistics, i.e., $H_s^2$ and $H_n^2$, is then calculated, respectively; it can be decided that there exist anomalies in the monitoring data when each of the statistics exceeds its corresponding control limit;

Step 4: Determine control limits (9) If the monitoring data is Gaussian distributed, the two statistics $H_s^2$ and $H_n^2$ theoretically follow the F-distribution, and the theoretical values of the control limits are determined as:

$$H_{s,lim}^s(\alpha) \approx \frac{m(m^2 l^2 - 1)}{ml(ml - m)} F_{m, ml-m}(\alpha)$$

$$H_{n,lim}^2(\alpha) \approx \frac{m(l-1)(m^2 l^2 - 1)}{m^2 l} F_{ml-m, m}(\alpha)$$

where $H_{s,lim}^2$ and $H_{n,lim}^2$ represent the control limits of statistics $H_s^2$ and $H_n^2$, respectively; α represents the significance level, it is generally set to 0.01;

(10) If the monitoring data is not Gaussian distributed, the probability density distributions of the two statistics $H_s^2$ and $H_n^2$ can be separately estimated by other methods, and then the control limits are determined according to the given significance level.

The present invention has the beneficial effect that: the spatial-temporal correlation of structural monitoring data are taken into account in the process of statistical modeling, based on that the defined statistics can effectively identify anomalies in the monitoring data.

DETAILED DESCRIPTION

Take a two-span highway bridge model, with a length of 5.5 m and a width of 1.8 m, as an example. A finite element model is built to simulate structural responses, and the responses at 16 finite element nodes are acquired as monitoring data. There are two datasets generated: the training dataset and the testing dataset; the training dataset consists of normal monitoring data, and part of the testing dataset is used to simulate abnormal monitoring data; both datasets last for 80 s and the sampling frequency is 256 Hz. The key of the present invention lies in the spatial-temporal correlation modeling process for the structural monitoring data, as shown in the following schematic:

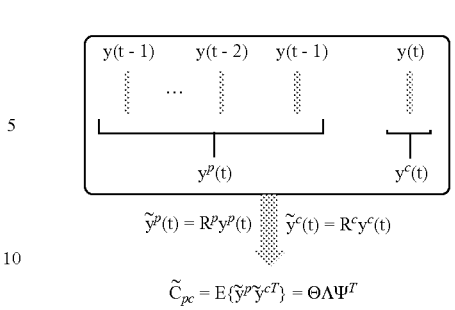

(1) Construct the current observation vector $y^c(t)$ and the past observation vector $y^p(t)$ for each data point in the training dataset; then pre-whiten all current and past observation vectors (i.e., $y^c(t)$ and $y^p(t)$) to obtain the whitening matrices (i.e., $R^c$ and $R^p$) and the pre-whitened data (i.e., $\tilde{y}^c(t)$ and $\tilde{y}^p(t)$).

(2) Establish spatial-temporal correlation model for the training dataset, that is, build a statistical correlation model for $\tilde{y}^c(t)$ and $\tilde{y}^p(t)$ to obtain the model parameters $Q=\Phi^T R^p$ and Λ; since there are only 16 non-zero correlation coefficients in Λ, the first 16 rows of the matrix Q are used to construct $Q_s$ and the others are used to construct $Q_n$.

(3) Determine the control limits of the statistics, i.e., $H_{s,lim}^2$ and $H_{n,lim}^2$; after new monitoring data is acquired, the past observation vector is first constructed, and then the two statistics, i.e., $H_s^2 = y^{pT}(Q_s^T Q_s) y^p$ and $H_n^2 = y^{pT}(Q_n^T Q_n) y^p$, are calculated; it can be decided that there exist anomalies in the monitoring data when each of the two statistics exceeds its corresponding control limit.

(4) Simulate abnormal monitoring data in the testing dataset, that is, the monitoring data of sensor 3 gains anomaly during time 40~80 s; identify anomalies in the monitoring data using the two proposed statistics $H_s^2$ and $H_n^2$, results show that both $H_s^2$ and $H_n^2$ can successfully identify anomalies in the monitoring data.

We claim:

1. An anomaly identification method for structural monitoring data considering spatial-temporal correlation, wherein, steps of which are as follows:

Step 1: Monitoring data preprocessing (1) Define current and past observation vectors for a normal monitoring data:

$$y^c(t) = y(t)$$

$$y^p(t) = [y^T(t-1), y^T(t-2), \ldots, y^T(t-l)]^T$$

where $y(t) \in \Re^m$ represents the sample at time t in the normal monitoring data, and m represents the number of measured variables; $y^c(t)$ and $y^p(t)$ represent the current and past observation vectors defined at time t, respectively; l represents the time-lag;

(2) Pre-whiten the current observation vector $y^c(t)$ and past observation vector $y^p(t)$:

$$\tilde{y}^c(t) = R^c y^c(t)$$

$$\tilde{y}^p(t) = R^p y^p(t)$$

where $R^c$ and $R^p$ represent pre-whitening matrices corresponding to $y^c(t)$ and $y^p(t)$, respectively; $\tilde{y}^c(t)$ and $\tilde{y}^p(t)$ represent the pre-whitened current and past observation vectors, respectively;

Step 2: Spatial-temporal correlation modeling (3) Establish a spatial-temporal correlation model for the normal monitoring data, that is, establish a statistical correlation model between $\tilde{y}^c(t)$ and $\tilde{y}^p(t)$ as follows:

$$(\tilde{C}_{pp}^{-1}\tilde{C}_{pc}\tilde{C}_{cc}^{-1}\tilde{C}_{cp})\varphi=\lambda^2\varphi$$

$$(\tilde{C}_{cc}^{-1}\tilde{C}_{cp}\tilde{C}_{pp}^{-1}\tilde{C}_{pc})\psi=\lambda^2\psi$$

where $\tilde{C}_{pp}=E\{\tilde{y}^p\tilde{y}^{pT}\}$ and $\tilde{C}_{cc}=E\{\tilde{y}^c\tilde{y}^{cT}\}$ represent auto-covariance matrices of $\tilde{y}^p(t)$ and $\tilde{y}^c(t)$, respectively; $\tilde{C}_{pc}=E\{\tilde{y}^p\tilde{y}^{cT}\}$ and $\tilde{C}_{cp}=E\{\tilde{y}^c\tilde{y}^{pT}\}$ represent cross-covariance matrices of $\tilde{y}^p(t)$ and $\tilde{y}^c(t)$, respectively;

(4) Since $\tilde{y}^p(t)$ and $\tilde{y}^c(t)$ are pre-whitened data, $\tilde{C}_{pp}$ and $\tilde{C}_{cc}$ are both identity matrices; by additionally considering $\tilde{C}_{pc}^T=\tilde{C}_{cp}$ and $\tilde{C}_{cp}^T=\tilde{C}_{pc}$, the statistical correlation model between $\tilde{y}^p(t)$ and $\tilde{y}^c(t)$ can be further simplified as follows:

$$(\tilde{C}_{pc}\tilde{C}_{pc}^T)\varphi=\lambda^2\varphi$$

$$(\tilde{C}_{cp}\tilde{C}_{cp}^T)\psi=\lambda^2\psi$$

(5) The solution of the above statistical correlation model can be obtained by a following singular value decomposition:

$$\tilde{C}_{pc}=E\{\tilde{y}^p\tilde{y}^{cT}\}=\Phi\Lambda\Psi^T$$

where $\Phi=[\varphi_1,\varphi_2,\ldots,\varphi_{ml}]\in\Re^{ml\times ml}$ and $\Psi=[\Psi_1, \Psi_2,\ldots,\Psi_m]\in\Re^{m\times m}$ represent matrices consisting of all left and right singular vectors, respectively; $\Lambda\in\Re^{ml\times m}$ represents a singular value matrix, in which m non-zero singular values are correlation coefficients between $\tilde{y}^p(t)$ and $\tilde{y}^c(t)$;

(6) Define a projection of $\tilde{y}^p(t)$ on $\Phi$, termed as z (t), which can be obtained by:

$$Z(t)=\Phi^T\tilde{y}^p(t)=\Phi^TR^py^p(t)=Qy^p(t)$$

where $Q=\Phi^TR^p$;

Step 3: Define statistics (7) Since there are only m non-zero correlation coefficients, variables in z(t) can be divided into two parts:

$$z_s(t)=Q_sy^p(t)$$

$$z_n(t)=Q_ny^p(t)$$

where $z_s(t)$ and $z_n(t)$ represent system-related and system-unrelated parts of z(t), respectively; $Q_s$ and $Q_n$ represent first m rows and last m (l−1) rows of Q, respectively;

(8) To identify anomalies in monitoring data, two statistics can be defined for $z_s(t)$ and $z_n(t)$:

$$H_s^2=z_s^Tz_s=y^{pT}(Q_s^TQ_s)y^p$$

$$H_n^2=z_n^Tz_n=y^{pT}(Q_n^TQ_n)y^p$$

For newly acquired monitoring data, the past observation vector $y^p$ is constructed firstly; two corresponding statistics $H^2_s$ and $H^2_n$ are then calculated, respectively; it can be decided that there exist anomalies in the monitoring data when each of the statistics exceeds its corresponding control limit;

Step 4: Determine control limits (9) If the monitoring data is Gaussian distributed, the two corresponding statistics $H^2_s$ and $H^2_n$ theoretically follow a F-distribution, and the theoretical values of the control limits are determined as:

$$H_{s,lim}^s(\alpha) \approx \frac{m(m^2l^2-1)}{ml(ml-m)}F_{m,ml-m}(\alpha)$$

$$H_{n,lim}^2(\alpha) \approx \frac{m(l-1)(m^2l^2-1)}{m^2l}F_{ml-m,m}(\alpha)$$

where $H^2_{s,lim}$ and $H^2_{n,lim}$ represent the control limits of the two corresponding statistics $H^2_s$ and $H^2_n$, respectively; $\alpha$ represents a significance level, it is generally set to 0.01;

(10) If the monitoring data is not Gaussian distributed, probability density distributions of the two corresponding statistics $H_s^2$ and $H_n^2$ can be separately estimated by other methods, and then the control limits are determined according to a given significance level.

* * * * *